(12) United States Patent  
Fujimoto

(10) Patent No.: US 6,414,631 B1
(45) Date of Patent: Jul. 2, 2002

(54) TIME SHARING TYPE MULTI-BEAM RADAR APPARATUS HAVING ALTERNATELY ARRANGED TRANSMITTING ANTENNAS AND RECEIVING ANTENNAS

(75) Inventor: Naoya Fujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/679,608

(22) Filed: Oct. 5, 2000

(30) Foreign Application Priority Data

Jun. 10, 1999 (JP) .......................... 11-285242
Jun. 2, 2000 (JP) ........................ 2000-165284

(51) Int. Cl.$^7$ ............................................. G01S 3/28
(52) U.S. Cl. ...................................... 342/379; 342/81
(58) Field of Search ......................... 342/79, 81, 154, 342/155, 373, 379

(56) References Cited

U.S. PATENT DOCUMENTS 5,045,859 A * 9/1991 Yetter .......................... 342/414
5,581,260 A * 12/1996 Newman ...................... 342/374
5,771,017 A * 6/1998 Dean et al. .................. 342/374
5,959,571 A * 9/1999 Aoyagi et al. ................. 342/70

FOREIGN PATENT DOCUMENTS

| JP | 2567332 | 9/1994 |
| JP | 7-005252 | 1/1995 |
| JP | 8-262133 | 10/1996 |

* cited by examiner

Primary Examiner—Dao Phan
(74) Attorney, Agent, or Firm—Foley & Lardner

(57) ABSTRACT

In a time sharing type multi-beam radar apparatus, a plurality of transmitting antennas are arranged in a first row, and each of the transmitting antennas has a first antenna pattern. Also, a plurality of receiving antennas are arranged in a second row in parallel with the first row, and each of the receiving antennas has a second antenna pattern. The first and second antenna patterns adjacent to each other spatially and partly overlap each other.

8 Claims, 11 Drawing Sheets

TIME SHARING TYPE MULTI-BEAM RADAR APPARATUS HAVING ALTERNATELY ARRANGED TRANSMITTING ANTENNAS AND RECEIVING ANTENNAS

BACKGROUND OF THE INVENTION

1. Field of the Invention

The present invention relates to a time sharing type multi-beam radar apparatus.

2. Description of the Related Art

Time sharing type multi-beam radar apparatuses using microwaves and millimeter waves have been mounted on vehicles to obtain an azimuth angle and distance of a near object.

A prior art time sharing type multi-beam radar apparatus is constructed by a plurality of transmitting/receiving antennas each connected to one transmitter, one receiver and one diplexer such as one circulator (see JP-A-6-242230, JP-A-7-5252 & JP-A-8-262133). In this case, each of the transmitting/receiving antennas has a transmitting antenna pattern and a receiving antenna pattern the same as the transmitting antenna pattern, so that a transmitting/receiving operation is carried out by a mixed antenna pattern of the transmitting antenna pattern and the receiving antenna pattern. Therefore, if the number of the transmitting/receiving antennas if four, the number of mixed antenna patterns is four.

In the above-described prior art time sharing type multi-beam radar apparatus, however, in order to enhance the detection accuracy, the number of transmitting/receiving antennas needs to be increased, which would increase the manufacturing cost. In addition, if the number of transmitting/receiving antennas is increased, the side lobe characteristics are deteriorated, which deteriorates the antenna gain. As a result, the detection accuracy cannot be enhanced.

SUMMARY OF THE INVENTION

It is an object of the present invention to provide a time sharing type multi-beam radar apparatus capable of enhancing the detection accuracy without increasing the manufacturing cost.

According to the present invention, in a time sharing type multi-beam radar apparatus, a plurality of transmitting antennas are arranged in a first row, and each of the transmitting antennas has a first antenna pattern. Also, a plurality of receiving antennas are arranged in a second row in parallel with the first row, and each of the receiving antennas has a second antenna pattern. The first and second antenna patterns adjacent to each other spatially and partly overlap each other.

Thus, if the number of transmitting antennas if four and the number of receiving antennas is four, which correspond to the case where the number of transmitting/receiving antennas is four, the number of mixed antenna patterns is seven, thus substantially decreasing the number of antennas. Also, since the side lobe characteristics are improved, the antenna gain can be enhanced, which would enhance the detection accuracy.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENT

Figure 1:
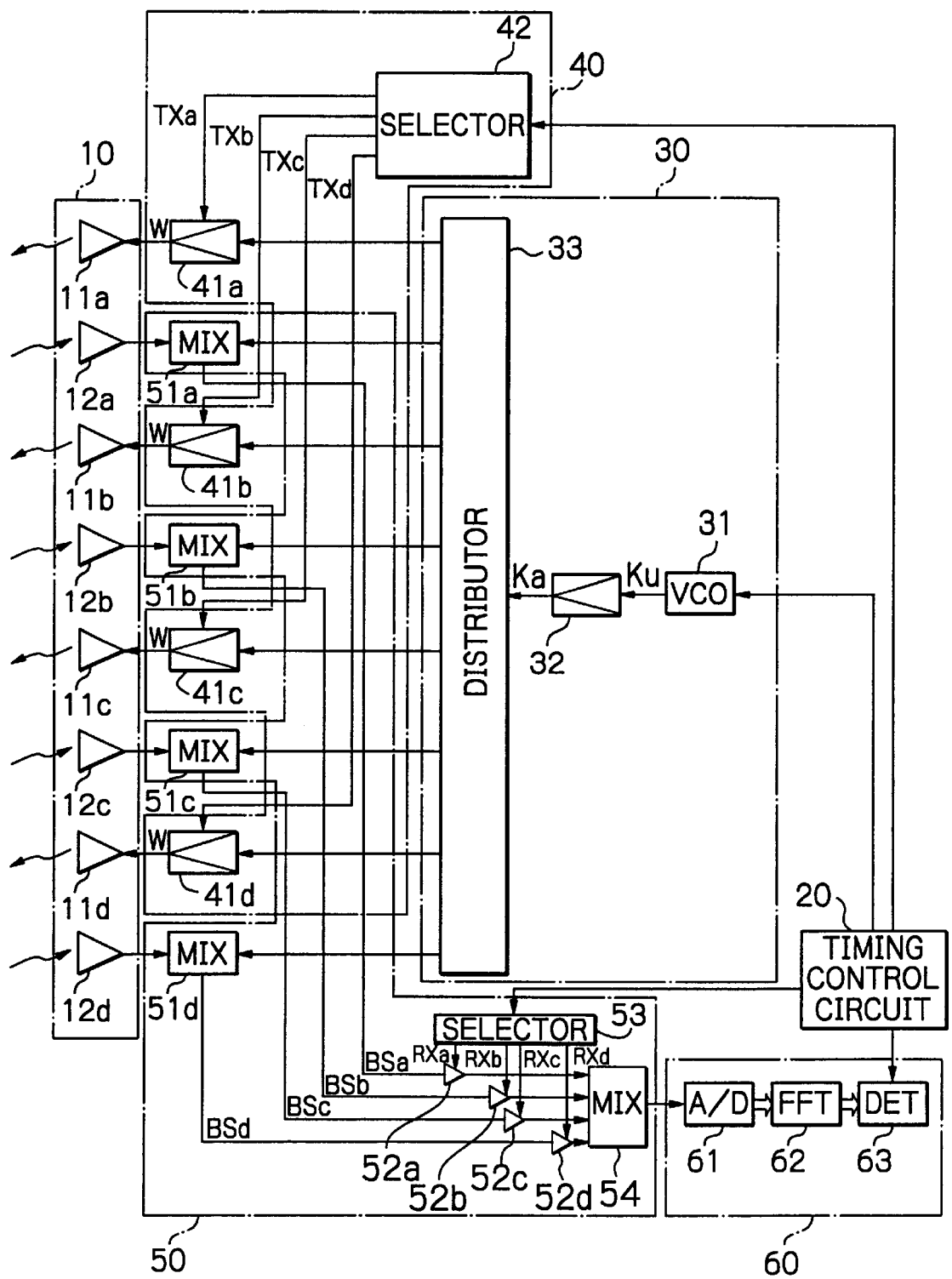
FIG. 1 is a block diagram illustrating an embodiment of the time sharing type multi-beam radar apparatus according to the present invention.

In FIG. 1, which illustrates an embodiment of the time sharing type multi-beam radar apparatus according to the present invention, an antenna section 10 is constructed by four transmitting antennas 11a, 11b, 11c and 11d and receiving antennas 12a, 12b, 12c and 12d alternately with the transmitting antennas 11a, 11b, 11c and 11d. The antennas 11a through 11d and 12a through 12d are arranged horizontally and substantially in a row.

An antenna pattern of one of the receiving antennas 12a, 12b, 12c and 12d spatially and partly overlaps an antenna pattern of its adjacent transmitting antenna. For example, one null point of the antenna pattern of one of the receiving antennas such as 12a is located within a first side lobe of the antenna pattern of one of the transmitting antenna such as 11a. This will be explained later in detail.

Reference numeral 20 designates a timing control circuit for controlling the entirety of the apparatus.

A signal generating circuit 30 is constructed by a voltage controlled oscillator (VSO) 31, a local multiplying amplifier 32, and a distributor 33. The VCO receives a frequency modulation (FM) control signal from the timing control circuit 20 to generate a Ku-band FM signal in response to the voltage level of the FM control signal. Also, the local multiplying amplifier 32 amplifies the Ku-band FM signal while multiplying the frequency of the Ku-band FM signal by three, thus generating a Ka-band FM signal. Further, the distributor 33 distributes the Ka-band FM signal to a transmitting circuit 40 and a receiving circuit 50.

Figure 2:
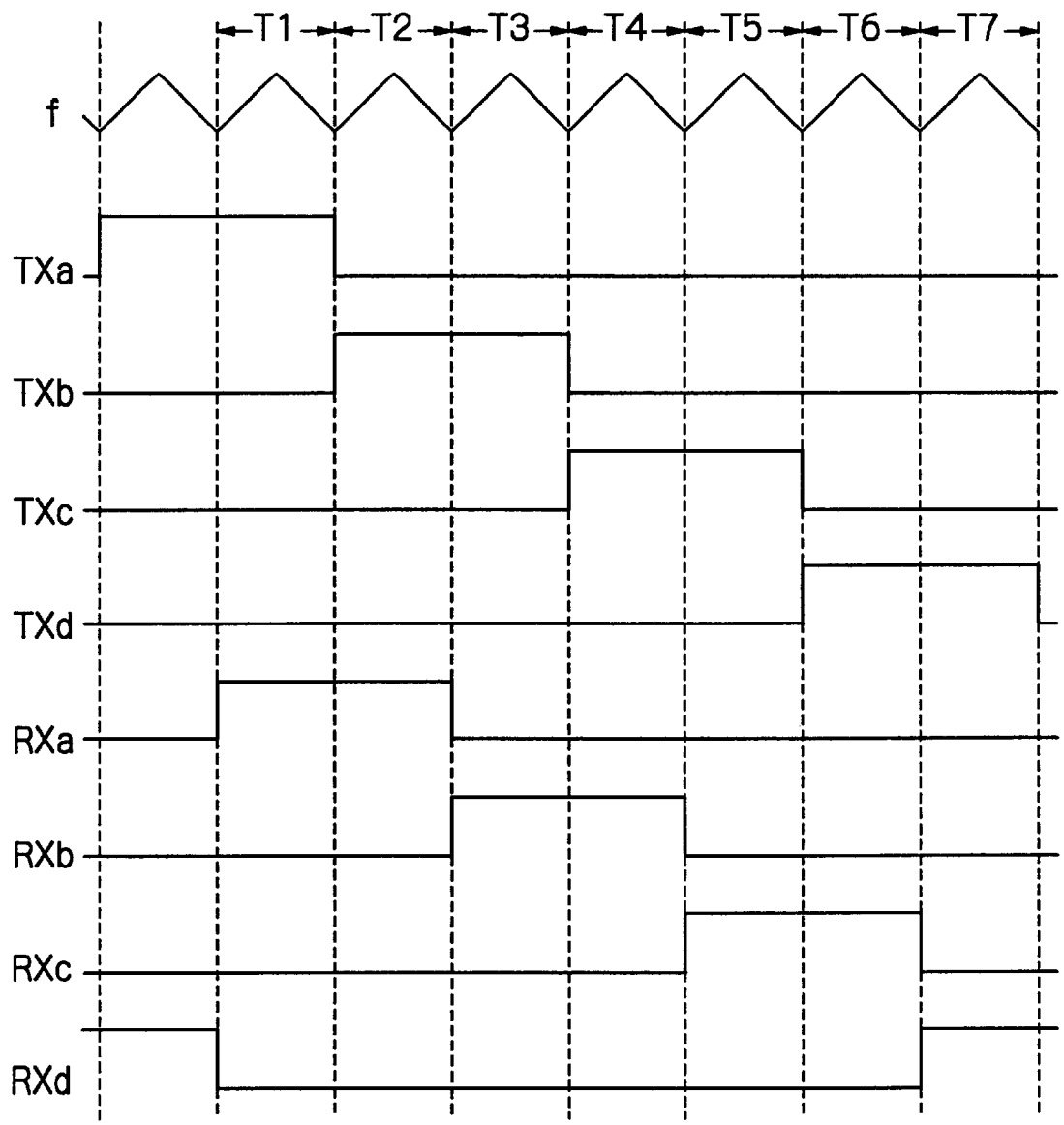
FIG. 2 is a timing diagram for explaining the operation of the apparatus of FIG. 1.

The transmitting circuit 40 is constructed by radio frequency (RF) multiplying amplifiers 41a, 41b, 41c and 41d for amplifying the Ka-band FM signal from the distributor 33 while multiplying the frequency of the Ka-band FM signal by two, generating W-band RF signals whose frequency f is changed as shown in FIG. 2. One of the W-band RF signals of the RF multiplying amplifiers 41a, 41b 41c and 41d is selected by a selector 42 which is controlled by the timing control circuit 20 to generate selection signals $TX_a$, $TX_b$, $TX_c$ and $TX_d$, as shown in FIG. 2. Thus, the W-band RF signals are supplied to the transmitting antennas 11a, 11b, 11c and 11d, so that the W-band RF signals are time-sharingly radiated from the transmitting antennas 11a, 11b, 11c and 11d.

The receiving circuit 50 is constructed by multiplying mixers 51a, 51b, 51c and 51d which mix received RF signals from the receiving antennas 12a, 12b, 12c and 12d, respectively, with twice the frequency of the W-band RF signals to generate beat signals $BS_a$, $BS_b$, $BS_c$ and $BD_d$, respectively. The beat signals $BS_a$, $BS_b$, $BS_c$ and $BS_d$ are amplified by amplifiers 52a, 52b, 52c, 52d. One of the amplifiers 52a, 52b, 52c and 52d is selected by a selector 53 which generates a selection signals $RX_a$, $RX_b$, $RX_c$ and $RX_d$ as shown in FIG. 2. Then, the selected beat signal is supplied to a mixer 54 which is connected to a detection circuit 60.

The detection circuit 60 is constructed by an analog/digital (A/D) converter 61 for performing an A/D conversion upon the output signal of the receiving circuit 50, a fast Fourier transform (FFT) circuit 62 for performing a Fourier transformation upon the output signal of the A/D converter 61 to generate a frequency spectrum signal, and a determination circuit 63 for detecting the azimuth angle and distance of an object in accordance with the frequency spectrum signal. The determination circuit 63 is controlled by a synchronization signal from the timing control circuit 20.

Figure 3:
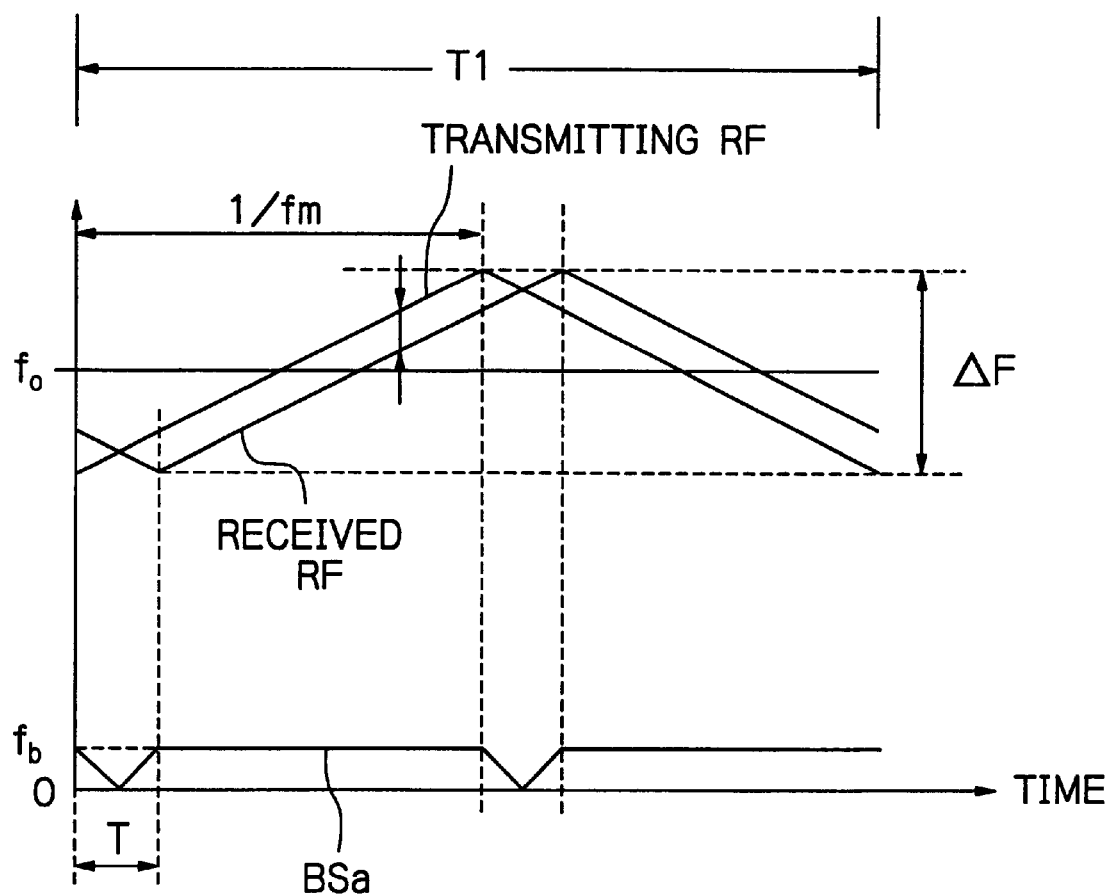
FIG. 3 is a timing diagram showing examples of a transmitting radio frequency (RF) signal, a received RF signal and a beat signal of FIG. 1.

In FIG. 3, which is a timing diagram showing the frequency of examples of a transmitting RF signal, a received RF signal and a beat signal BS, it is assumed that the transmitting RF signal is radiated from the transmitting antenna 11a, and the received RF signal is received by the received antenna 12a for a first time period T1, as shown in FIG. 2 where only the antennas 11a and 12a are activated. In this case, the transmitting RF signal and the received RF signal are both centered at a frequency $f_0$ which is the center frequency of the W-band. The received RF signal is delayed as compared with the transmitting RF signal by a time T which corresponds to the distance d of an object. That is, $$T=2d/c$$

where c is light speed. Therefore, since the frequency $f_b$ of the beat signal $BS_a$ is represented by the difference in frequency between the transmitting RF signal and the received RF signal, the distance d is calculated by $$d=(c/(4 \cdot \Delta F \cdot f_a)) \cdot f_b$$

where $\Delta F$ is the width of the frequency modulation; and $f_a$ is a frequency of a triangular waves of the RF signals. Therefore, in the detection circuit 60, the determination circuit 63 detects the maximum frequency component from the frequency spectrum signal to determine the distance d of the object and simultaneously, the azimuth angle of the object.

Figure 4:
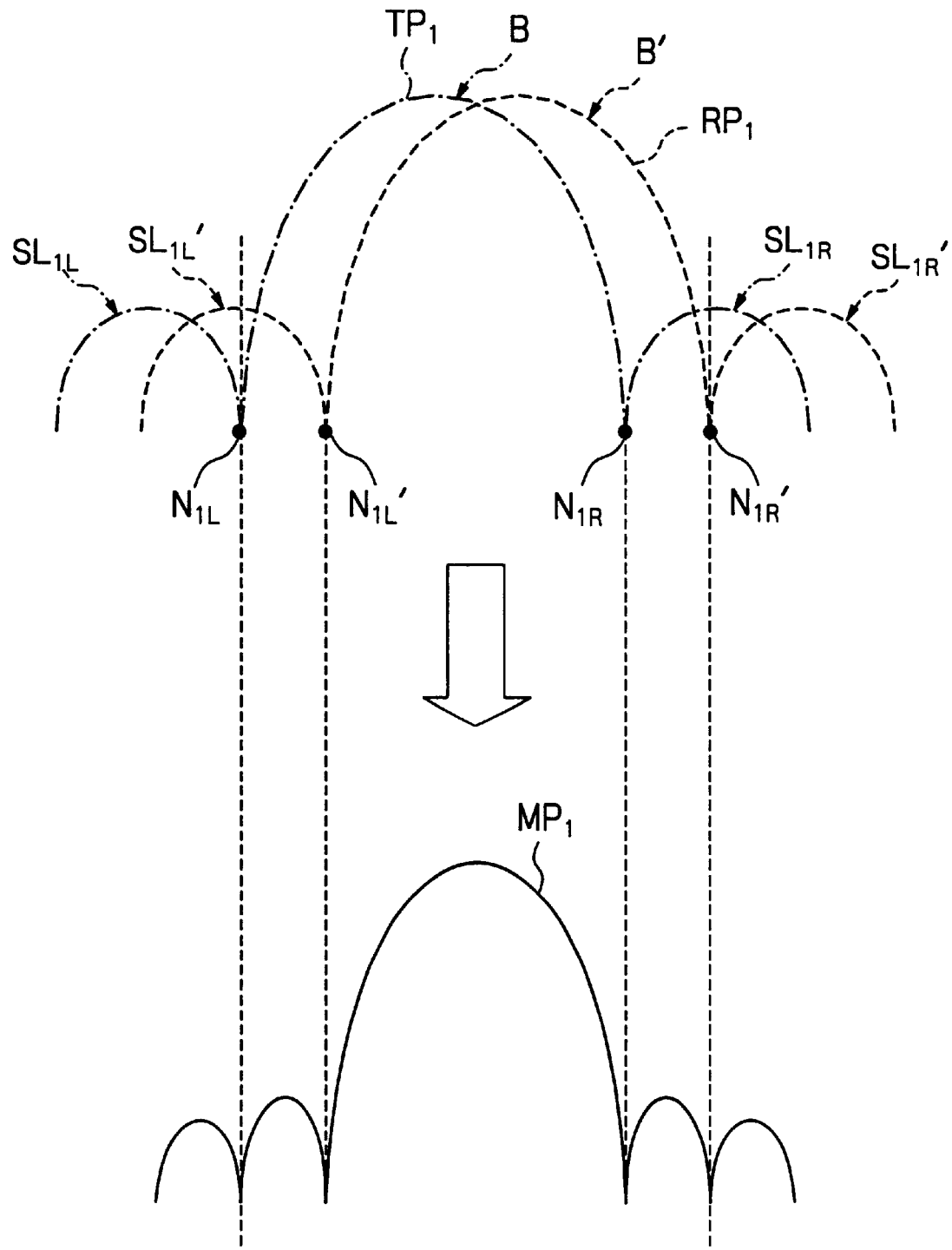
FIG. 4 is a diagram for explaining a mixed antenna pattern obtained by an antenna pattern of one of the transmitting antennas and its adjacent receiving antenna of FIG. 1.

In FIG. 4, which is a diagram for explaining a mixed antenna pattern $MP_1$ obtained by an antenna pattern $TP_1$ of the transmitting antenna 11a and an antenna pattern $RP_1$ of the receiving antenna 12a, the antenna pattern $TP_1$ and the antenna pattern $RP_1$ spatially and partly overlap each other, in other words, a main lobe B of the antenna pattern $TP_1$ spatially and partly overlaps a main lobe B' of the antenna pattern $RP_1$. As a result, a left-side null point $N_{1L}$ of the antenna pattern $TP_1$ is located within a left-side first-order side lobe $SL_{1L}'$ of the antenna pattern $RP_1$, and a right-side null point $N_{1R}'$ of the antenna pattern $RP_1$, is located within a right-side first-order side lobe $SL_{1R}$ of the antenna pattern $TR_1$. Thus, in the mixed antenna pattern $MP_1$, a main lobe is narrowed, and also, the side lobe characteristics are suppressed.

Figure 5:
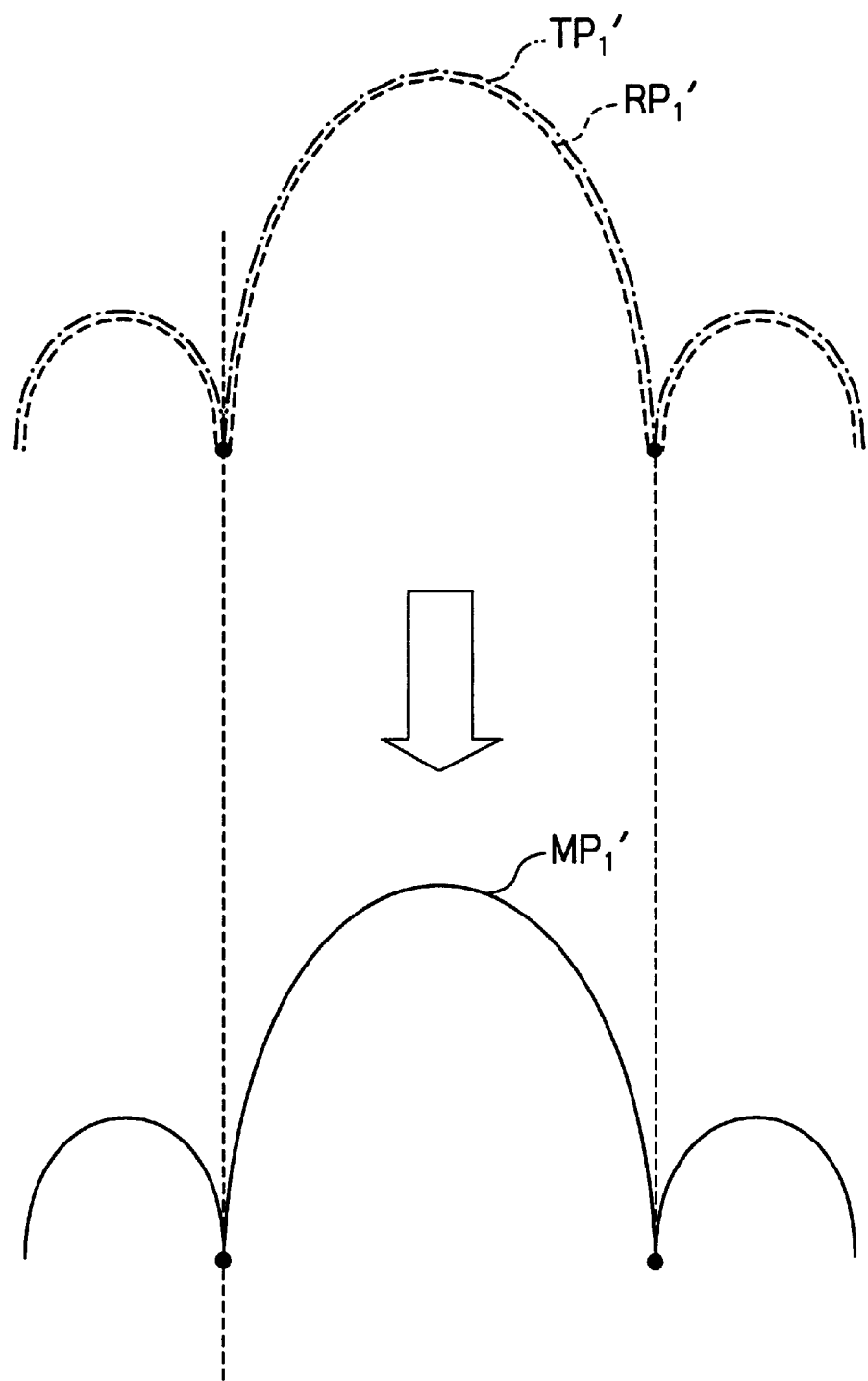
FIG. 5 is a diagram for explaining a mixed antenna pattern in the prior art time sharing type multi-beam radar apparatus.

Note that, in the prior art as shown in FIG. 5, since a transmitting antenna pattern $TP_1'$ of one transmitting/receiving antenna is the same as a received antenna pattern $RP_1'$ of the same transmitting/receiving antenna, a mixed antenna pattern $MP_1'$ has a wide main lobe while the side lobe characteristics are not suppressed.

Figure 6:
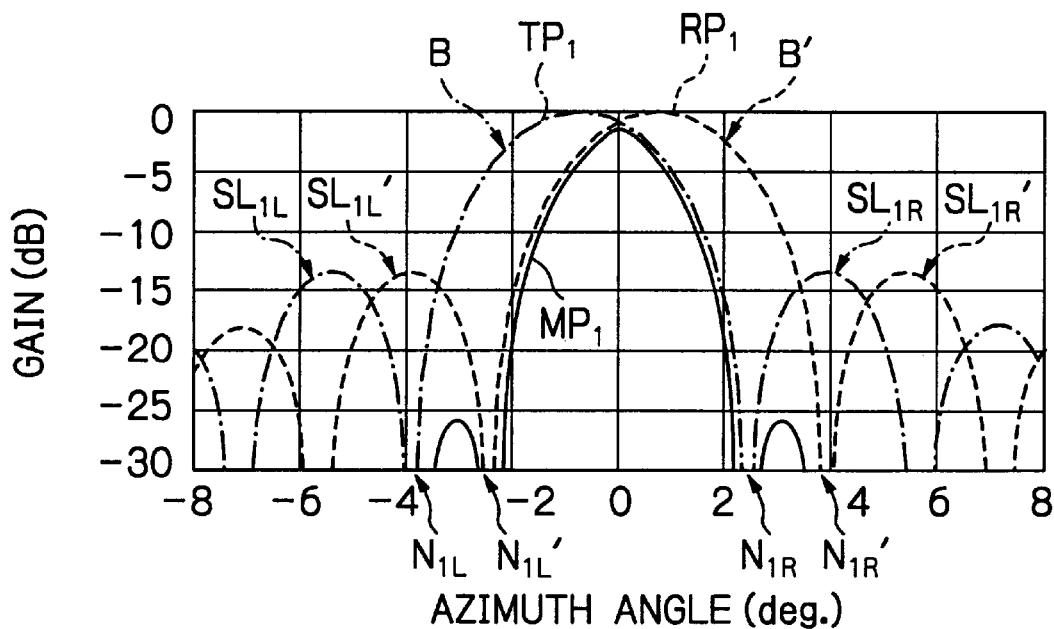
FIG. 6 is a diagram showing examples of the transmitting antenna pattern, the receive antenna pattern and the mixed antenna pattern of FIG. 4.

An example of the antenna pattern $TP_1$, the antenna pattern $PR_1$ and the mixed antenna pattern $MP_1$ of FIG. 4 is explained with reference to FIG. 6. In FIG. 6, the −3 dB width of the main lobe B of the antenna pattern $TP_1$ and the −3 dB width of the main lobe B' of the antenna pattern $RP_1$ are both 3 degrees. Also, the null points $N_{1L}$ and $N_{1R}$ are about 3.2 degrees apart from the center of their main lobe B, and the null points $N_{1L}'$ and $N_{1R}'$ are about 3.2 degrees apart from the center of their main lobe B'. Further, the first-order side lobes $SL_{1L}$ and $SL_{1R}$ have a height of about −13 dB and are about 4.6 degrees apart from the center of the main lobe B, and the first-order side lobes $SL_{1L}'$ and $SL_{1R}'$ have a height of about −13 dB and are about 4.6 degrees apart from the center of the main lobe B'.

In FIG. 6, if the spacing (azimuth angle) between the transmitting antenna 11a and the receiving antenna 12a is about 1.4 degrees, the mixed pattern $MP_1$ has a peak of −2 dB where those of the main lobes B and B' are 0 dB, and the −3 dB width of the mixed pattern $MP_1$ is about 2 degrees, which means that the mixed pattern $MP_1$ is remarkably narrowed. Also, the height of the first-order side lobes of the mixed pattern $MP_1$ is −24 dB, which means that the side lobe characteristics are remarkably suppressed.

Figure 7:
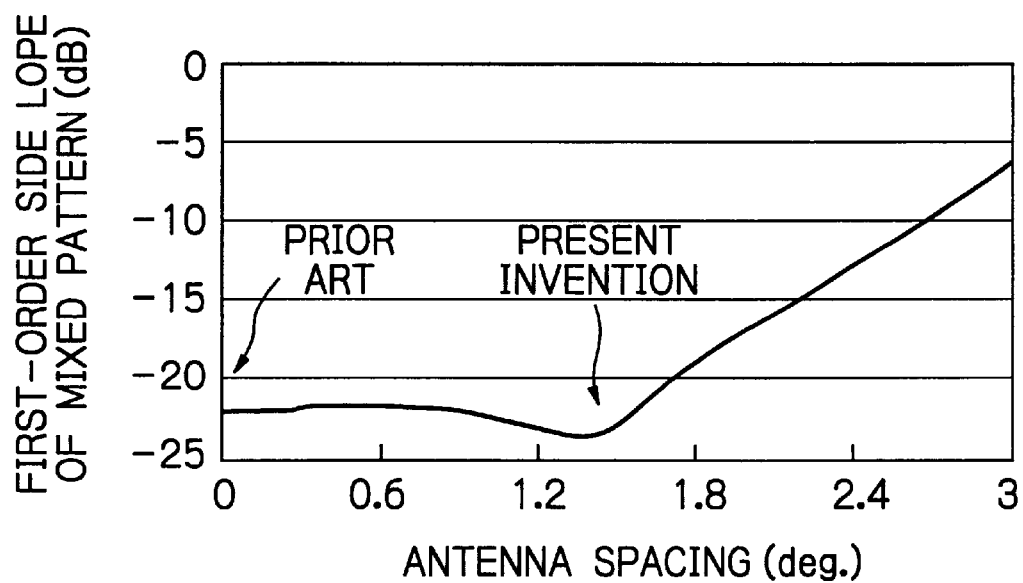
FIG. 7 is a diagram showing the relationship between the antenna spacing and the side lobe characteristics of FIG. 6.

As shown in FIG. 7, as the spacing (azimuth angle) between the transmitting antenna 11a and the receiving antenna 12a is changed, the height of the first-order side lobes of the mixed pattern $MP_1$ is first decreased and then increased. That is, when the spacing is about 1.4 degrees, the height of the side lobes of the mixed pattern $MP_1$ is minimum. In other words, when the left-side null point $N_{1L}$ of the transmitting pattern $TP_1$ coincides with the center of the left-side first-order side lobe $SL_{1L}'$ of the received pattern $RP_1$ and the right-side null point $N_{1R}'$ of the received pattern $RP_1$ coincides with the center of the right-side first-order side lobe $SL_{1R}$ of the transmitting pattern $TP_1$, the height of the side lobes of the mixed pattern $MP_1$ is minimum.

Note that, in FIG. 7, in the prior art, the spacing between the transmitting antenna and the receiving antenna is zero. Therefore, the side lobe characteristics are not sufficiently suppressed.

Figure 8:
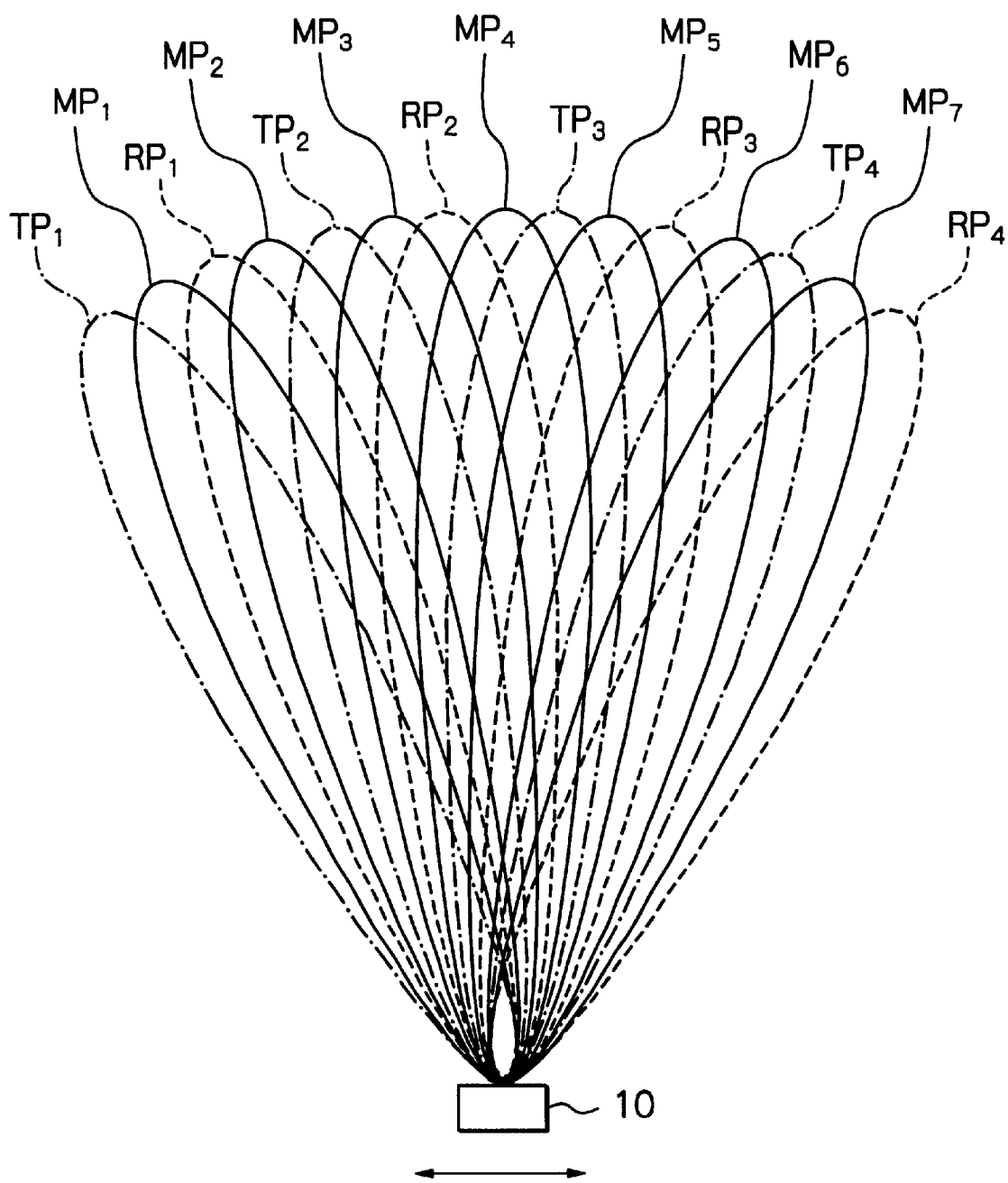
FIG. 8 is a diagram for showing the antenna patterns of the apparatus of FIG. 1.

The antenna patterns of the apparatus of FIG. 1 time-sharingly operated by the timing signals $TX_a$, $TX_b$, $TX_c$, $TX_d$, $RX_a$, $RX_b$, $RX_c$ and $RX_d$ as shown in FIG. 2 will be explained next with reference to FIG. 8.

During a time period T1 of FIG. 2, the transmitting antenna 11a and the receiving antenna 12a are activated. As a result, a mixed pattern $MP_1$ as shown in FIG. 8 is obtained by a transmitting antenna pattern $TP_1$ and a receiving antenna pattern $RP_1$. An object pattern obtained by the mixed pattern $MP_1$ is stored in a memory of the determination circuit 63.

During a time period T2 of FIG. 2, the transmitting antenna 11b and the receiving antenna 12a are activated. As a result, a mixed pattern $MP_2$ as shown in FIG. 8 is obtained by a transmitting antenna pattern $TP_2$ and a receiving antenna pattern $RP_1$. An object pattern obtained by the mixed pattern $MP_2$ is stored in a memory of the determination circuit 63.

During a time period T3 of FIG. 2, the transmitting antenna 11b and the receiving antenna 12b are activated. As a result, a mixed pattern MP$_3$ as shown in FIG. 8 is obtained by a transmitting antenna pattern TP$_2$ and a receiving antenna pattern RP$_2$. An object pattern obtained by the mixed pattern MP$_3$ is stored in the memory of determination circuit 63.

During a time period T4 of FIG. 2, the transmitting antenna 11c and the receiving antenna 12b are activated. As a result, a mixed pattern MP$_4$ as shown in FIG. 8 is obtained by a transmitting antenna pattern TP$_3$ and a receiving antenna pattern RP$_2$. An object pattern obtained by the mixed pattern MP$_4$ is stored in the memory of determination circuit 63.

During a time period T5 of FIG. 2, the transmitting antenna 11c and the receiving antenna 12c are activated. As a result, a mixed pattern MP$_5$ as shown in FIG. 8 is obtained by a transmitting antenna pattern TP$_3$ and a receiving antenna pattern RP$_3$. An object pattern obtained by the mixed pattern MP$_5$ is stored in the memory of determination circuit 63.

During a time period T6 of FIG. 2, the transmitting antenna 11d and the receiving antenna 12c are activated. As a result, a mixed pattern MP$_6$ as shown in FIG. 8 is obtained by a transmitting antenna pattern TP$_4$ and a receiving antenna pattern RP$_3$. An object pattern obtained by the mixed pattern MP$_6$ is stored in the memory of determination circuit 63.

During a time period T7 of FIG. 2, the transmitting antenna 11d and the receiving antenna 12d are activated. As a result, a mixed pattern MP$_7$ as shown in FIG. 8 is obtained by a transmitting antenna pattern TP$_4$ and a receiving antenna pattern RP$_4$. An object pattern obtained by the mixed pattern MP$_7$ is stored in the memory of determination circuit 63.

Thus, in the above-described embodiment where the number of transmitting antennas is four and the number of receiving antennas is four, seven mixed antenna patterns are obtained. Note that, in the prior art where the number of transmitting/receiving antennas is four, only four mixed antenna patterns are obtained.

Figure 9:
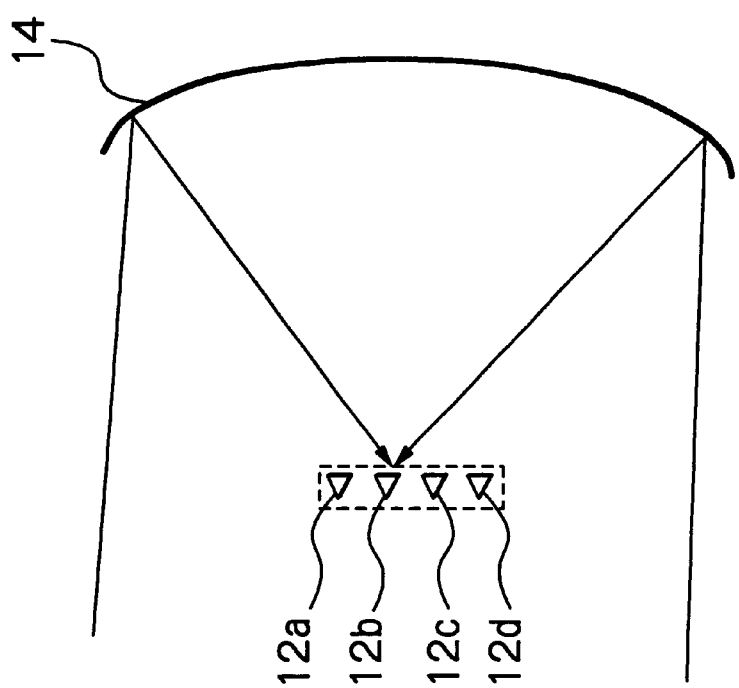
FIGS. 9, 10, 11 and 12 are diagrams showing the arrangement of the antennas of FIG. 1.
Figure 9:
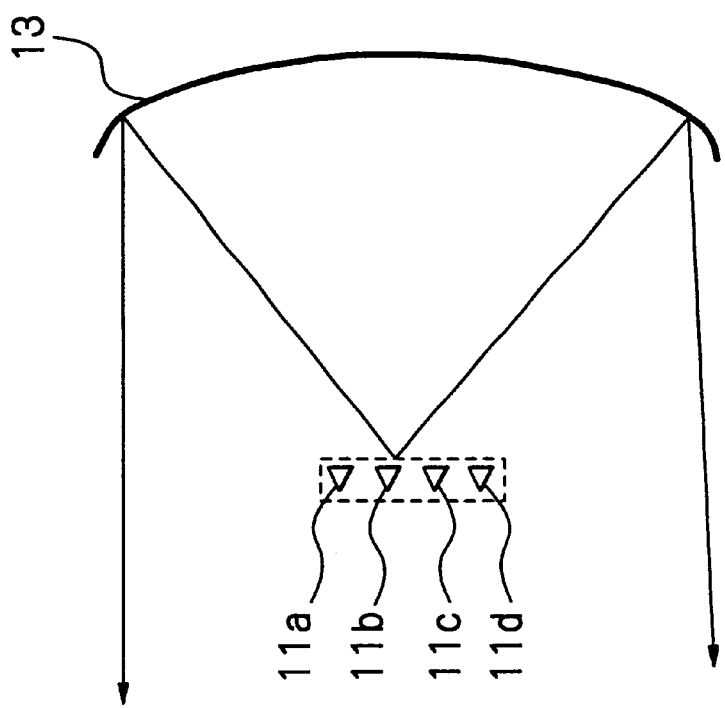

In FIG. 9, which illustrates a first example of the arrangement of the antennas of FIG. 1, the transmitting antennas 11a, 11b, 11c and 11d as a primary radiator are arranged horizontally in a row and are associated with a common transmitting reflector 13, thus forming a defocus parabola antenna. In this case, the transmitting antennas 11a, 11b, 11c and 11d are located at a focus face of the common transmitting reflector 13, so that transmitting RF signals are radiated from the transmitting antennas 11a, 11b, 11c and 11d to the common transmitting reflector 13. On the other hand, the receiving antennas 12a, 12b, 12c and 12d as a primary radiator are arranged horizontally in a row in parallel with the row of the transmitting antennas 12a, 12b, 12c and 12d and are associated with a common receiving reflector 14, thus forming a defocus parabola antenna. In this case, the receiving antennas 12a, 12b, 12c and 12d are located at a focus face of the common receiving reflector 14, so that received RF signals are radiated from the common receiving reflector 14 to the receiving antennas 12a, 12b, 12c and 12d to.

In FIG. 9, the transmitting antennas 11a, 11b, 11c and 11d and the receiving antennas 12a, 12b, 12c and 12d are arranged so that a null point of one transmitting antenna pattern coincides with the center of a first-order side lobe of a received antenna pattern.

Figure 10:
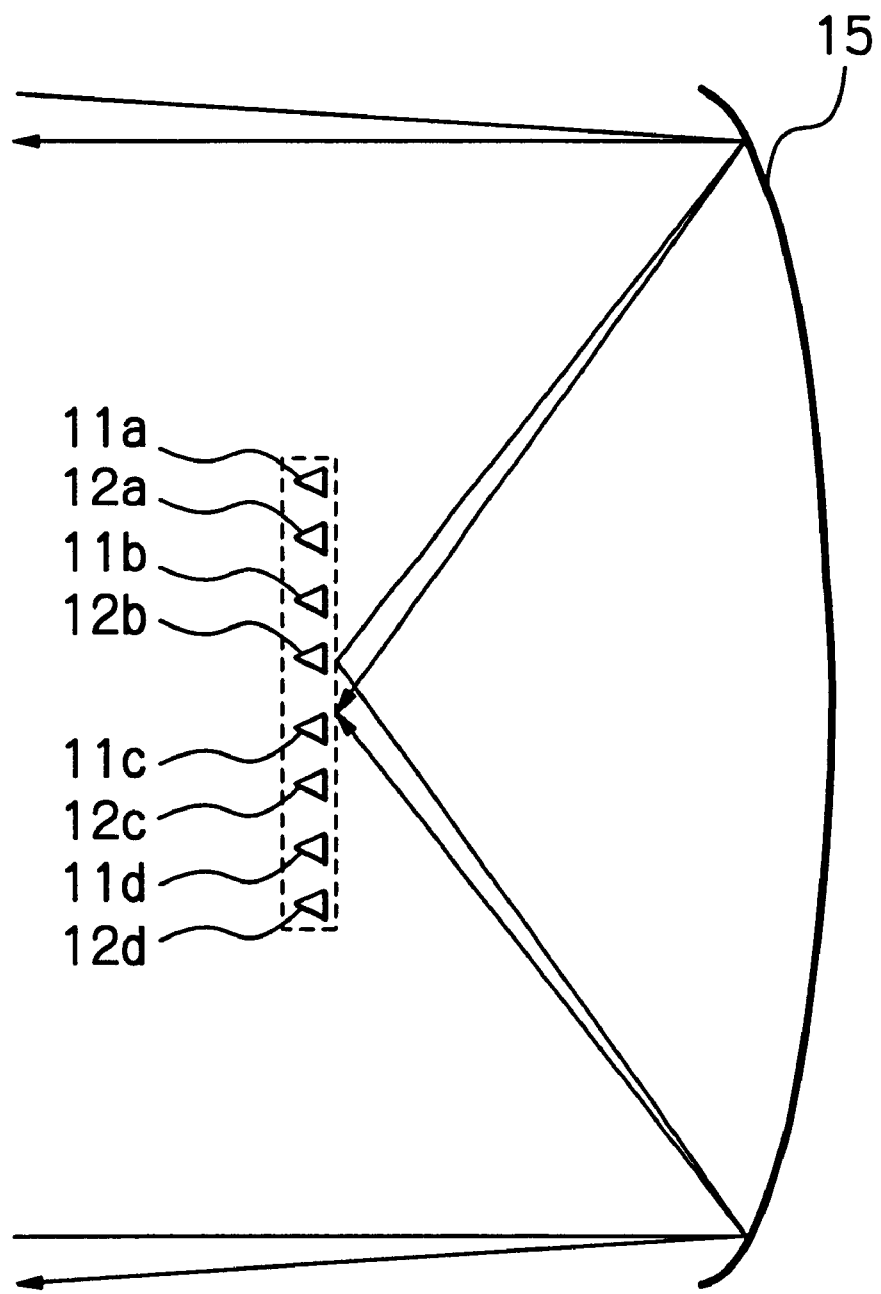

In FIG. 10, which illustrates a second example of the arrangement of the antennas of FIG. 1, the transmitting antennas 11a, 11b, 11c and 11d as a primary radiator and the receiving antennas 12a, 12b, 12c and 12d for a primary radiator are arranged alternately and horizontally in a row and are associated with a common transmitting/receiving reflector 15, thus forming a defocus parabola antenna. In this case, the antennas 11a, 12a, 11b, 12b, 11c 12c, 11d and 12d are located at a focus face of the common transmitting/receiving reflector 15, so that transmitting RF signals are radiated from the transmitting antennas 11a, 11b, 11c and 11d to the common transmitting/receiving reflector 15. On the other hand, received RF signals are radiated from the common transmitting/receiving reflector 15 to the receiving antennas 12a, 12b, 12c and 12d.

Even in FIG. 10, the transmitting antennas 11a, 11b, 11c and 11d and the receiving antennas 12a, 12b, 12c and 12d are arranged so that a null point of one transmitting antenna pattern coincides with the center of a first-order side lobe of a received antenna pattern. Also, since the common transmitting/receiving reflector 15 is provided instead of the common transmitting reflector 13 and the common receiving reflector 14 of FIG. 9, the apparatus of FIG. 10 can be reduced in size.

Figure 11:
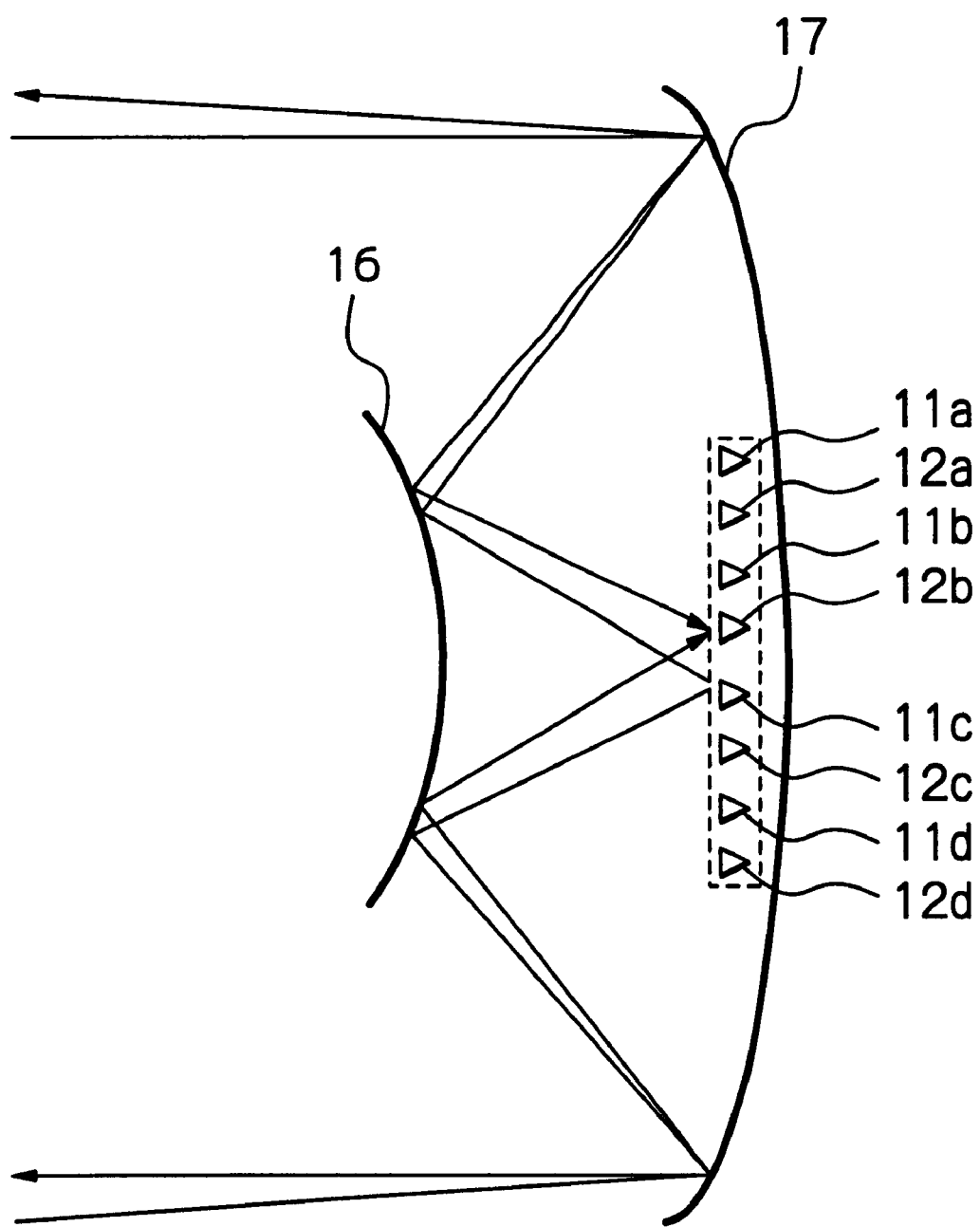

In FIG. 11, which illustrates a third example of the arrangement of the antennas of FIG. 1, the transmitting antennas 11a, 11b, 11c and 11d as a primary radiator and the receiving antennas 12a, 12b, 12c and 12d for a primary radiator are arranged alternately and horizontally in a row and are associated with a common main transmitting/receiving reflector 16 and a common sub transmitting/receiving reflector 17, thus forming a defocus parabola antenna. In this case, the antennas 11a, 12a, 11b, 12b, 11c 12c, 11d and 12d are located at a focus face of the common transmitting/receiving reflectors 16 and 17, so that transmitting RF signals are radiated from the transmitting antennas 11a, 11b, 11c and 11d via the common main transmitting/receiving reflector 16 to the common sub transmitting/receiving reflector 17. On the other hand, received RF signals are radiated from the sub common transmitting/receiving reflector 17 via the common main transmitting/receiving reflector 16 to the receiving antennas 12a, 12b, 12c and 12d to.

Even in FIG. 11, the transmitting antennas 11a, 11b, 11c and 11d and the receiving antennas 12a, 12b, 12c and 12d are arranged so that a null point of one transmitting antenna pattern coincides with the center of a first-order side lobe of a received antenna pattern. Also, since the power supply lines to the antennas 11a, 11b, 11c, 12a, 12b, 12c and 12d can be shortened, the apparatus of FIG. 11 can be reduced in size and power.

Figure 12:
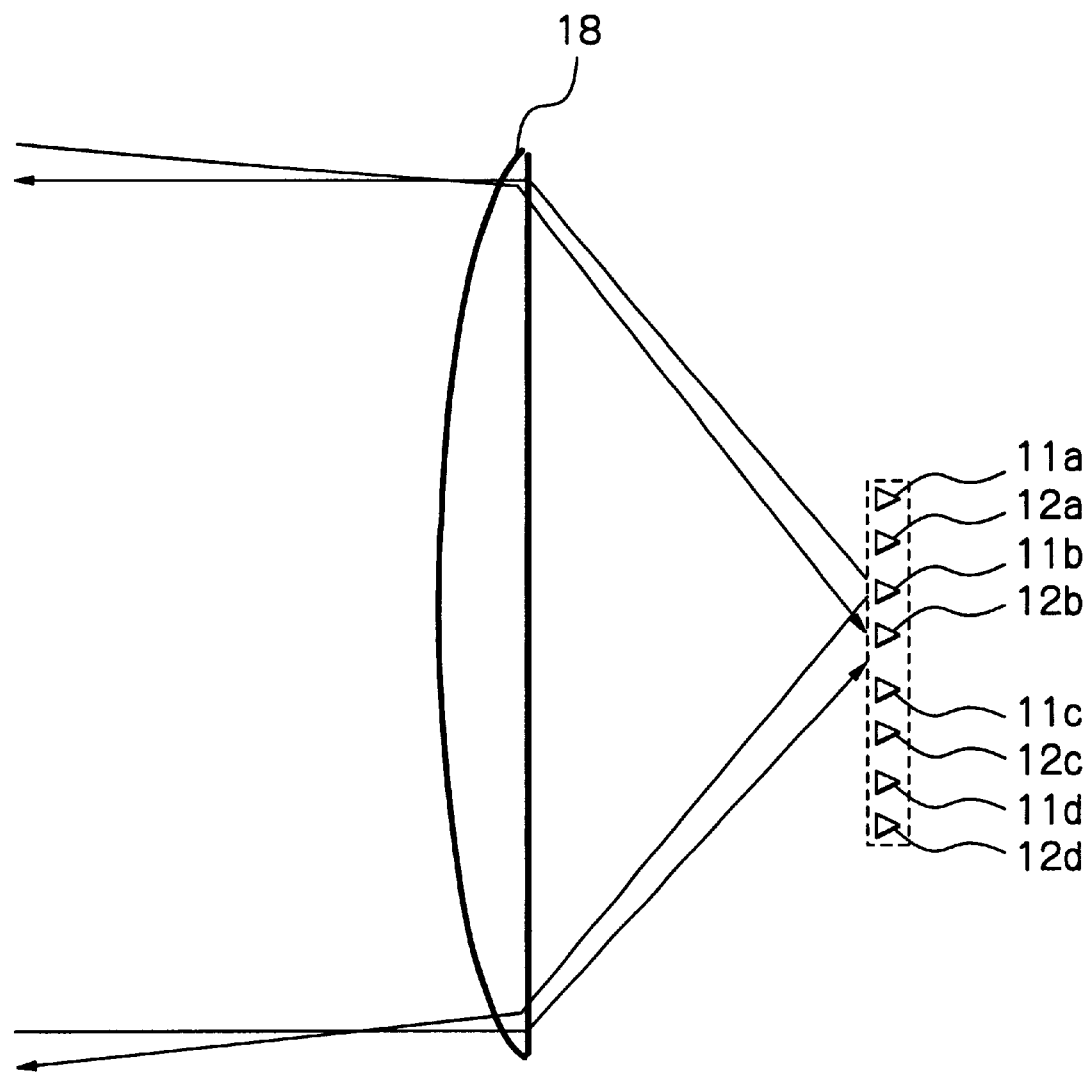

In FIG. 12, which illustrates a fourth example of the arrangement of the antennas of FIG. 1, the transmitting antennas 11a, 11b, 11c and 11d as a primary radiator and the receiving antennas 12a, 12b, 12c and 12d for a primary radiator are arranged alternately and horizontally in a row and are associated with a common main transmitting/receiving lens 18, thus forming an offset defocus parabola antenna. In this case, the antennas 11a, 12a, 11b, 12b, 11c 12c, 11d and 12d are located at a focus face of the common transmitting/receiving lens 18, so that transmitting RF signals are radiated from the transmitting antennas 11a, 11b, 11c and 11d to the common transmitting/receiving lens 18. On the other hand, received RF signals are radiated from the common transmitting/receiving lens 18 to the receiving antennas 12a, 12b, 12c and 12d.

Even in FIG. 12, the transmitting antennas 11a, 11b, 11c and 11d and the receiving antennas 12a, 12b, 12c and 12d are arranged so that a null point of one transmitting antenna pattern coincides with the center of a first-order side lobe of a received antenna pattern. Also, since the power supply lines to the antennas 11a, 11b, 11c, 11d, 12a, 12b, 12c and 12d can be shortened, the apparatus of FIG. 12 can be reduced in size and power.

As explained hereinabove, according to the present invention, since the number of mixed antenna patterns is increased, the number of antennas can be substantially decreased, which would decrease the manufacturing cost. Also, since the side lobe characteristics are improved, the antenna gain can be enhanced, which would enhance the detection accuracy.

What is claimed is:

1. A time sharing type multi-beam radar apparatus comprising:

a plurality of transmitting antennas, arranged in a first row, each of said transmitting antennas having a first antenna pattern; and a plurality of receiving antennas, arranged in a second row in parallel with said first row, each of said receiving antennas having a second antenna pattern, wherein said first antenna patterns of said transmitting antennas and second antenna patterns of said receiving antennas are adjacent to each other spatially and partly overlap each other, and wherein said plurality of transmitting and receiving antennas are arranged such that said first antenna patterns of said transmitting antennas alternate with said second antenna patterns of said receiving antennas.

2. The apparatus as set forth in claim 1, wherein one null point of a main lobe of said first antenna pattern is within one first-order side lobe of said second antenna pattern, and one null point of a main lobe of said second antenna pattern is within one first-order side lobe of said first antenna pattern.

3. The apparatus as set forth in claim 1, wherein one null point of a main lobe of said first antenna pattern substantially coincides with a center of one first-order side lobe of said second antenna pattern, and one null point of a main lobe of said second antenna pattern substantially coincides with a center of one first-order side lobe of said first antenna pattern.

4. The apparatus as set forth in claim 1, further comprising:

a transmitting reflector having a focus face in which said transmitting antennas are arranged; and a receiving reflector having a focus face in which said receiving antennas are arranged.

5. The apparatus as set forth in claim 1, further comprising a transmitting/receiving reflector having a focus face in which said transmitting antennas and said receiving antennas are alternately arranged.

6. The apparatus as set forth in claim 1, further comprising:

a main transmitting/receiving reflector; and a sub transmitting/receiving reflector opposing said main transmitting/receiving reflector, said transmitting antennas and said receiving antennas being alternately arranged in a focus face of said main and sub transmitting/receiving reflector.

7. The apparatus as set forth in claim 1, further comprising a transmitting/receiving lens having a focus face in which said transmitting antennas and said receiving antennas are alternately arranged.

8. The apparatus as set forth in claim 1, further comprising:

a transmitting circuit, connected to said transmitting antennas, for time-sharingly activating said transmitting antennas;

a receiving circuit, connected to said receiving antennas, for time-sharingly activating said receiving antennas;

a detection circuit, connected to said receiving circuit, for detecting an azimuth angle and a distance of an object; and a signal generating circuit, connected to said transmitting circuit and said receiving circuit, for supplying a continuously changed frequency modulation signal to said transmitting circuit and said receiving circuit.

* * * * *